(12) United States Patent
Shetty et al.

(10) Patent No.: US 12,348,673 B2
(45) Date of Patent: Jul. 1, 2025

(54) TELEPHONE NUMBER DEACTIVATION PROCESS

(71) Applicant: International Business Machines Corporation, Armonk, NY (US)

(72) Inventors: Shilpa Shetty, Sydney (AU); Jignesh K. Karia, Thane (IN); Mukundan Sundararajan, Bangalore (IN); Deepa Dubey, Mumbai (IN); Pankaj Satyanarayan Dayama, Bangalore (IN); Vishal Awal, Mumbai (IN)

(73) Assignee: International Business Machines Corporation, Armonk, NY (US)

(*) Notice: Subject to any disclaimer, the term of this patent is extended or adjusted under 35 U.S.C. 154(b) by 206 days.

(21) Appl. No.: 18/167,989

(22) Filed: Feb. 13, 2023

(65) Prior Publication Data
US 2024/0275883 A1    Aug. 15, 2024

(51) Int. Cl.
| | |
|---|---|
| *H04M 3/436* | (2006.01) |
| *G06F 16/903* | (2019.01) |
| *H04M 7/00* | (2006.01) |
| *H04M 3/42* | (2006.01) |

(52) U.S. Cl.
CPC ...... *H04M 3/436* (2013.01); *G06F 16/90335* (2019.01); *H04M 7/0048* (2013.01); *H04M 3/42297* (2013.01)

(58) Field of Classification Search
CPC ............ H04M 3/436; H04M 7/0048; H04M 3/42297; H04M 3/38; G06F 16/90335
See application file for complete search history.

(56) References Cited

U.S. PATENT DOCUMENTS

| | | | | |
|---|---|---|---|---|
| 6,466,654 | B1* | 10/2002 | Cooper | G10L 15/26 379/88.16 |
| 6,757,362 | B1* | 6/2004 | Cooper | H04M 3/527 379/88.16 |
| 8,099,080 | B1* | 1/2012 | Rae | H04M 3/38 379/189 |
| 9,680,989 | B2 | 6/2017 | Scully | |
| 11,082,814 | B1* | 8/2021 | Roldan | H04W 4/14 |

(Continued)

FOREIGN PATENT DOCUMENTS

IN        202141046631        4/2022

OTHER PUBLICATIONS

"Handling Deactivated Phone Numbers," Openmarket.com, Industry Guidelines, Date Accessed: Nov. 30, 2022, pp. 1-9 https://www.openmarket.com/docs/Content/globalcoverage/north-america/deactivated-phone-Nos. htm.

(Continued)

*Primary Examiner* — Akelaw Teshale
(74) *Attorney, Agent, or Firm* — Patterson + Sheridan, LLP

(57) ABSTRACT

A system and method for deactivating telephone numbers are presented. The method includes, in response to a request to deactivate a telephone number, communicating a query to a blockchain for the telephone number, wherein a block on the blockchain identifies an organization that had sent a previous message to the telephone number. The method also includes determining, based on a response to the query, the organization and generating and activating a filter configured to stop a future message sent by the organization to the telephone number.

20 Claims, 8 Drawing Sheets

(56) References Cited

U.S. PATENT DOCUMENTS

| | | | |
|---|---|---|---|
| 11,271,920 B2* | 3/2022 | Arora | H04L 9/3297 |
| 11,368,422 B1* | 6/2022 | Sohn | H04L 51/212 |
| 2008/0089503 A1* | 4/2008 | Crockett | H04M 3/42153 |
| | | | 379/201.03 |
| 2012/0163225 A1* | 6/2012 | Mishkin | H04M 15/8292 |
| | | | 370/252 |
| 2014/0192969 A1 | 7/2014 | Brown et al. | |
| 2016/0112560 A1* | 4/2016 | Scully | H04M 3/42059 |
| | | | 455/415 |
| 2017/0201622 A1* | 7/2017 | Fei | H04M 3/42382 |
| 2018/0041638 A1* | 2/2018 | Gupta | H04L 67/02 |
| 2018/0131667 A1* | 5/2018 | Jain | H04M 3/436 |
| 2018/0359211 A1* | 12/2018 | Charles | H04L 51/224 |
| 2023/0289425 A1* | 9/2023 | Doumar | H04L 9/3236 |
| 2024/0275883 A1* | 8/2024 | Shetty | H04M 7/0048 |
| 2024/0314095 A1* | 9/2024 | DeLuca | H04L 51/48 |

OTHER PUBLICATIONS

Kevin Lee and Arvind Narayanan, "Security and Privacy Risk of Number Recycling at Mobile Carriers in the United States," IEEE, Year: 2021, pp. 1-17.

Ryan Disraeli, "No. Deactivation and The Recycled Phone No. Dilemma," Industry Insights, Dated: Jan. 1, 2021, pp. 1-6.

Ankita Chakravarti, "Your old phone No. can be used to gain access to your private information," India Today, Dated May 4, 2021, pp. 1-5.

* cited by examiner

800

- COMPUTER  801
  - PROCESSOR SET  810
    - PROCESSING CIRCUITRY  820
    - CACHE  821
  - COMMUNICATION FABRIC  811
  - VOLATILE MEMORY  812
  - PERSISTENT STORAGE  813
    - OPERATING SYSTEM  822
    - MESSAGING CODE  900
  - PERIPHERAL DEVICE SET  814
    - UI DEVICE SET  823
    - STORAGE  824
    - IoT SENSOR SET  825
  - NETWORK MODULE  815

- END USER DEVICE  803
- REMOTE SERVER  804
  - REMOTE DATABASE  830
- WAN  802
- PRIVATE CLOUD  806
- GATEWAY  840
- PUBLIC CLOUD  805
  - CLOUD ORCHESTRATION MODULE  841
  - HOST PHYSICAL MACHINE SET  842
  - VIRTUAL MACHINE SET  843
  - CONTAINER SET  844

FIG. 8

TELEPHONE NUMBER DEACTIVATION PROCESS

BACKGROUND

The present invention relates to telecommunications, and more specifically, to deactivating telephone numbers.

SUMMARY

According to an embodiment, a method includes, in response to a request to deactivate a telephone number, communicating a query to a blockchain for the telephone number, wherein a block on the blockchain identifies an organization that had sent a previous message to the telephone number. The method also includes identifying, based on a response to the query, the organization and generating and activating a filter configured to stop a future message sent by the organization to the telephone number. Other embodiments include a system that performs the method and a non-transitory computer readable medium storing instructions that, when executed, cause a processor to perform the method.

BRIEF DESCRIPTION OF THE DRAWINGS

FIG. 8 illustrates an example computing environment.

DETAILED DESCRIPTION

Figure 1:
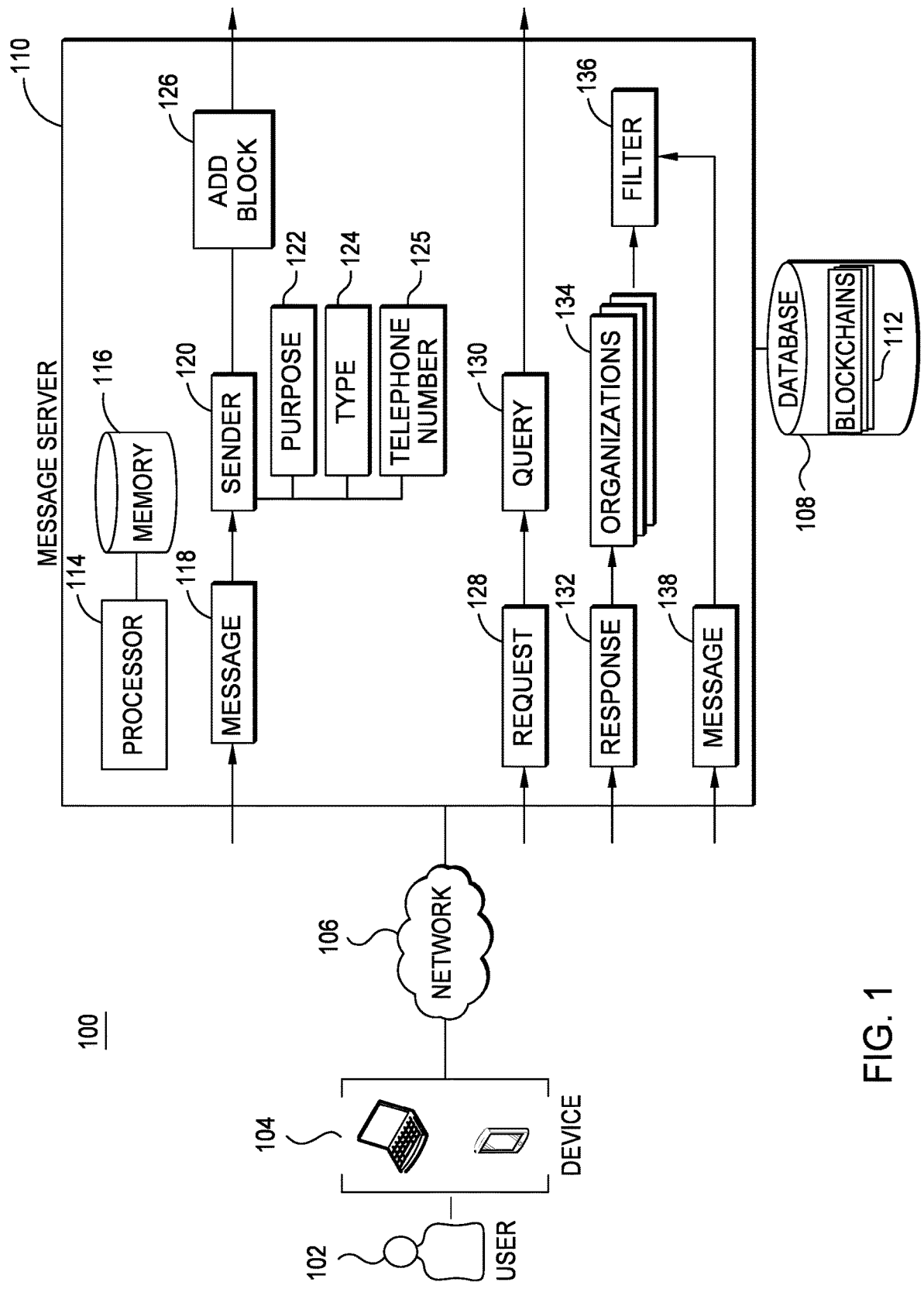
FIG. 1 illustrates an example system.

In telecommunications, users or subscribers may be identified with or assigned telephone numbers (e.g., a mobile station international subscriber directory number (MSISDN)). Messages and calls may be directed to a user through the telephone number for that user. When a user wants to deactivate a number and be assigned a new number, the user notifies a telecommunications carrier, and the carrier deactivates the old number. The user may be assigned a new number by the carrier or another carrier. After a cooling off period, the deactivated number may be assigned to a different user.

Certain organizations and services also identify the user using a telephone number. For example, banks, restaurants, stores, websites, etc. may keep the telephone number as part of a user's profile. At times, these organizations may also send messages (e.g., short message service (SMS) messages or multimedia messaging service (MMS) messages) to the user using the telephone number. For example, the organizations may send promotional offers or deals through messages to the telephone number. As another example, the organizations may send authentication information (e.g., security codes or keys) through messages to the telephone number.

When the user deactivates an old telephone number, the telecommunications carrier may not know the different organizations that identify the user using the old telephone number. Moreover, the different organizations may not know that the user has deactivated the old telephone number. Consequently, if the old telephone number is assigned to a new user, that new user may begin receiving messages from the organizations intended for the previous user. As a result, the personal information or security of the previous user may be put at risk due to limitations in the telephone number deactivation process.

The present disclosure describes a system and process for deactivating telephone numbers that may prevent messages intended for a previous user from being sent to a new user when a telephone number is reassigned. Generally, the system uses a blockchain to store and track the various organizations that identify a user using a telephone number. When the user receives a message from an organization, a block identifying or linked to that organization may be added to the blockchain. When the user requests deactivation of the telephone number, the system may query the blockchain to determine the organizations that send messages to the user through the telephone number. The system may then generate a filter for the telephone number that will catch messages that those organizations may mistakenly send to the user through the deactivated telephone number, which may prevent those messages from unintentionally being sent to another user. In some instances, the system may alert the organizations when the telephone number is being deactivated. Moreover, if a user decides to port a telephone number (e.g., move the telephone number to a different telecommunications carrier), the system may send the blockchain for the telephone number to the next carrier to continue tracking the organizations that communicate with the user through the telephone number.

The system obtains consent prior to receiving, storing, or handling user information. For example, the system may obtain user consent before the system monitors and stores information from messages sent by organizations to the user. Additionally, the system stores and handles the user information in accordance with all applicable laws and regulations.

FIG. 1 illustrates an example system 100. As seen in FIG. 1, the system 100 includes one or more devices 104, a network 106, a database 108, and a message server 110. Generally, the system 100 tracks the organizations that identify a user 102 with a telephone number. When the user 102 requests to deactivate the telephone number, the system 100 queries a blockchain for the telephone number to determine the organizations that identify the user 102 with the telephone number. The system 100 then generates a filter that can be used to filter future messages sent by the organizations to the telephone number. In this manner, the system 100 may prevent these future messages from being sent to an incorrect recipient (e.g., if the telephone is reassigned to another user), which may improve the security and privacy for the user 102 after the telephone number is deactivated.

The user 102 uses the device 104 to interact with the system 100. The device 104 may receive messages (e.g., SMS messages, MMS messages, emails, or calls) from various organizations, such as banks, restaurants, stores and websites. These organizations may identify the user 102 with the telephone number. For example, these organizations may store a profile of the user 102 that includes the telephone number. The organizations may send messages to the user 102 by sending the messages to the telephone number.

These messages may serve any suitable purpose. For example, the organizations may send messages that include promotional offers or deals. As another example, the organizations may send messages that include authentication information, such as security codes or keys. These organizations may identify the user 102 with the telephone number. For example, these organizations may store a profile of the user 102 that includes the telephone number.

In existing systems, when the user 102 deactivates the telephone number, the organizations may not know that the user 102 has deactivated the telephone number. As a result, when the deactivated telephone number is reassigned to another user 102. The organizations may begin sending the new user 102 messages that were intended for the old user 102. These messages may reveal personal information about the old user 102 (e.g., which organizations the old user 102 uses, security codes or keys, what type of products the old user 102 prefers, etc.). Thus, the security and privacy of the old user 102 may be put at risk.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 108 may be part of a blockchain system. The database 108 stores one or more blockchains 112. Each of the blockchains 112 may be for a particular telephone number. The blockchains 112 may include blocks that identify or are linked to certain organizations that have sent messages previously to the telephone numbers. The database 108 may receive queries that query the blocks or entries for a particular blockchain 112. The database 108 may generate and communicate responses that return the results for the queries of a particular blockchain 112.

Each blockchain 112 may store information about a user 102 and various organizations in a secure fashion. For example, the information in each blockchain 112 may be encrypted, such that an organization or the user 102 may not discover personal information about the user 102 by reviewing the blockchains 112. Thus, the blockchains 112 improve the security of the information about the user 102 and the organizations that identify the user 102 using the telephone number of the user 102.

The message server 110 handles messages through the system 100. For example, the message server 110 may handle messages communicated to the device 104, and the message server 110 may handle messages sent by the device 104. Generally, when a telephone number is deactivated, the message server 110 may generate a filter that may be used to filter future messages sent by organizations to the deactivated telephone number. In this manner, the message server 110 may improve the privacy and security of information of the user 102 when the user 102 deactivates the telephone number. As seen in FIG. 1, the message server 110 includes a processor 114 and a memory 116, which may perform the functions or actions of the message server 110 described herein.

The processor 114 is any electronic circuitry, including, but not limited to one or a combination of microprocessors, microcontrollers, application specific integrated circuits (ASIC), application specific instruction set processor (ASIP), and/or state machines, that communicatively couples to memory 116 and controls the operation of the message server 110. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on the memory 116 to perform any of the functions described herein. The processor 114 controls the operation and administration of the message server 110 by processing information (e.g., information received from the devices 104, network 106, and memory 116). The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

When an organization sends a message 118 to the device 104, the message 118 may pass through the message server 110 before reaching the device 104. The message 118 may be a text message (e.g., an SMS message or an MMS message). The message server 110 may analyze the message 118 to determine certain information about the organization. For example, the message server 110 may parse the message 118 to determine a sender 120 that sent the message 118. The sender 120 may be the organization that originated the message 118. The message server 110 may also determine other aspects of the message 118. For example, the message server 110 may analyze the text or the body of the message 118 to determine a purpose 122 or a type 124 for the message 118. The purpose 122 may indicate the reason that the message 118 was sent. For example, the purpose 122 may indicate that the message 118 is a promotional offer or that the message 118 communicates a security code. The type 124 may indicate that the message 118 is a SMS or MMS message. In some embodiments, the type 124 may indicate that the message 118 is a telephone call or an email message. The message server 110 also determines a telephone number 125 to which the message 118 was to be sent. The telephone number 125 may belong to the user 102.

The message server 110 then adds a block 126 to a blockchain 112 for the telephone number 125. The block 126 may include or encapsulate the sender 120, the purpose 122, and/or the type 124. The message server 110 may add the block 126 to the blockchain 112 for the telephone number 125 by issuing an instruction to the database 108 or the blockchain system, or the message server 110 may communicate the block 126 directly to the database 108 or the blockchain system. As a result of sending the instruction or the block 126 to the blockchain system, the blockchain system may add the block 126 to the blockchain 112 for the telephone number 125. In this manner, the blockchain 112 tracks the organizations that have sent messages 118 to the device 104. In some embodiments, the message server 110 may then transmit or communicate the message 118 to the device 104.

When the user 102 wishes to deactivate the telephone number 125 assigned to the user 102, the user 102 may communicate a request 128 to the message server 110. The request 128 may come from the device 104 or a telecommunications carrier assigned to the device 104. The request 128 may indicate the telephone number 125 and an instruction to deactivate the telephone number 125. In response to receiving the request 128, the message server 110 communicates a query 130 to the blockchain system. For example, the message server 110 may communicate the query 130 to the database 108. The query 130 may include the telephone number 125 that is to be deactivated.

The blockchain system or the database 108 may query the blockchain 112 for the telephone number 125 to retrieve the information included or encapsulated in the blocks of the blockchain 112. This information may identify the different organizations that have previously sent messages 118 to the telephone number 125. The blockchain system or the database 108 may generate a response 132 to the query 130 and communicate the response 132 to the message server 110.

The response 132 may identify the organizations 134 that have previously sent messages 118 to the telephone number 125. In some embodiments, the response 132 may also indicate the purposes 122 and the types 124 of the messages 118 that the organizations 134 have previously sent to the telephone number 125. The message server 110 generates a filter 136 using the organizations 134 identified in the response 132. For example, the filter 136 may be designed to filter or catch future messages sent by the organizations 134. The filter 136 may also include the purpose 122 and the type 124 to limit the future messages caught by the filter 136 to messages of a particular purpose 122 or messages of a particular type 124. The message server 110 may then activate the filter 136.

When a subsequent message 138 is communicated to the telephone number 125 (e.g., after the telephone number 125 had been deactivated and reassigned to another user 102), the message server 110 intercepts the message 138. The message server 110 then runs the message 138 through the filter 136 to see if the filter 136 catches or filters the message 138. If the filter 136 catches or filters the message 138, the message server 110 may prevent the message 138 from being communicated to the telephone number 125. For example, the message server 110 may determine that, because the message 138 was caught by the filter 136, the message 138 was sent by an organization 134 and the message 138 may have been intended for a previous user 102 assigned to the telephone number 125. In response, the message server 110 prevents that message 138 from being communicated to a new user who has been reassigned to the telephone number 125. In some embodiments, the message server 110 may communicate the message 138 back to the organization 134 that sent the message 138 to alert the organization 134 that the telephone number 125 has been reassigned to a new user 102.

In some embodiments, the user 102 may instruct the message server 110 to port the telephone number 125 (e.g., move the telephone number 125 to a different carrier). In response, the message server 110 may port the telephone number 125 and move the blockchain 112 to the other carrier. In this manner, the other carrier may also track the organizations 134 that previously sent messages 118 to the telephone number 125.

Figure 2:
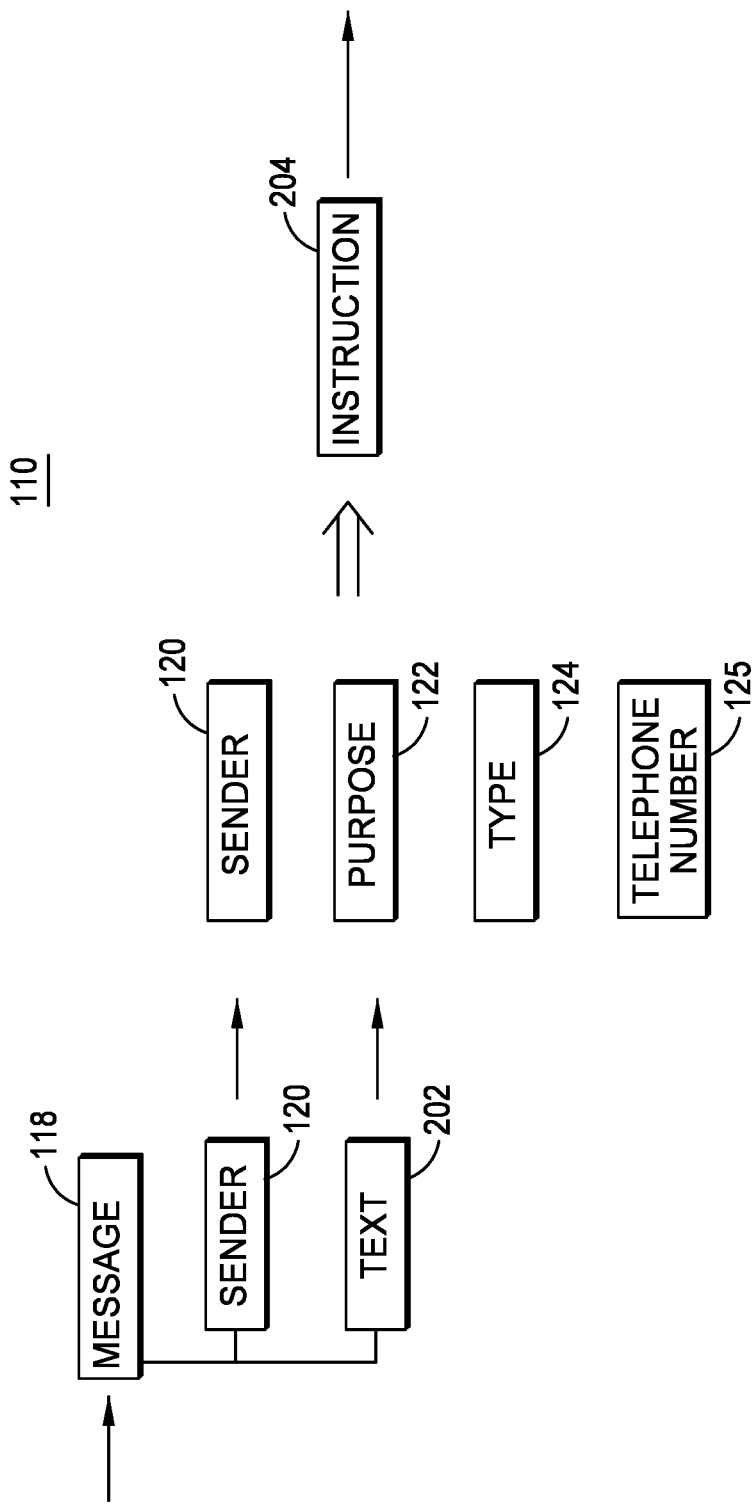
FIG. 2 illustrates an example message server of the system of FIG. 1.

FIG. 2 illustrates an example message server 110 of the system 100 of FIG. 1. Generally, FIG. 2 shows the message server 110 adding a block to a blockchain using information from a message 118. In particular embodiments, by adding the block to the blockchain, the message server 110 allows a sender 120 of the message 118 to be linked to a telephone number 125 of a user 102 receiving the message 118.

The message server 110 receives the message 118. The message 118 may identify the sender 120 of the message 118 (e.g., in a header of the message 118). The message 118 may also include text 202 that forms the body of the message 118. The message 118 may be a text message (e.g., an SMS or MMS message). In some instances, the message 118 may be an email message or a call.

The message 118 identifies the sender 120 of the message 118. For example, the message 118 may include a header that includes a telephone number or identifier for the sender 120 of the message 118. The message 118 may also identify an intended recipient of the message 118. For example, the message 118 may include a telephone number 125 to which the message 118 should be sent. Additionally, the message 118 includes text 202. The text 202 may form the body of the message 118 and may include the information intended for the recipient of the message 118. For example, the text 202 may include promotional offers. As another example, the text 202 may include a security code or key. The message server 110 may have received or intercepted the message 118 after the sender 120 sent the message 118, and before the intended recipient receives the message 118.

The message server 110 parses or reads the message 118 to determine particular information from the message 118. In the example of FIG. 2, the message server 110 determines the sender 120 from the message 118. For example, the message server 110 may parse or read the header of the message 118 to identify the sender 120. The message server 110 may also determine a purpose 122 or a type 124 for the message 118 from the information in the message 118. For example, the message server 110 may determine the purpose 122 by parsing or reading the text 202 in the message 118. The purpose 122 may indicate why the message 118 was sent. For example, the purpose 122 may indicate that the message 118 is a promotional message or that the message 118 is an authentication message.

The message server 110 may also analyze the information in the message 118 to determine the type 124 for the message 118. The type 124 may indicate any suitable information about the message 118. For example, the type 124 may indicate that the message 118 is a text message, an email, or a call.

The message server 110 may also identify the telephone number 125, to which the message 118 is to be sent. For example, the message server 110 may analyze a header in the message 118 to determine the telephone number 125 of the recipient of the message 118.

The message server 110 then generates an instruction 204 to add a block to a blockchain for the telephone number 125. The message server 110 may communicate the instruction 204 to a blockchain system that stores the blockchain for the telephone number 125 so that the block may be added to the blockchain. In some embodiments, the message server 110 generates the block that is to be added to the blockchain. The message server 110 then communicates the block along with the instruction 204 to add the block to the blockchain for the telephone number 125. The block may identify or encapsulate information about the sender 120, the purpose 122, and/or the type 124 of the message 118. By adding the block to the blockchain, the blockchain stores or includes information about the senders 120 that have sent message 118 to the telephone number 125.

Figure 3:
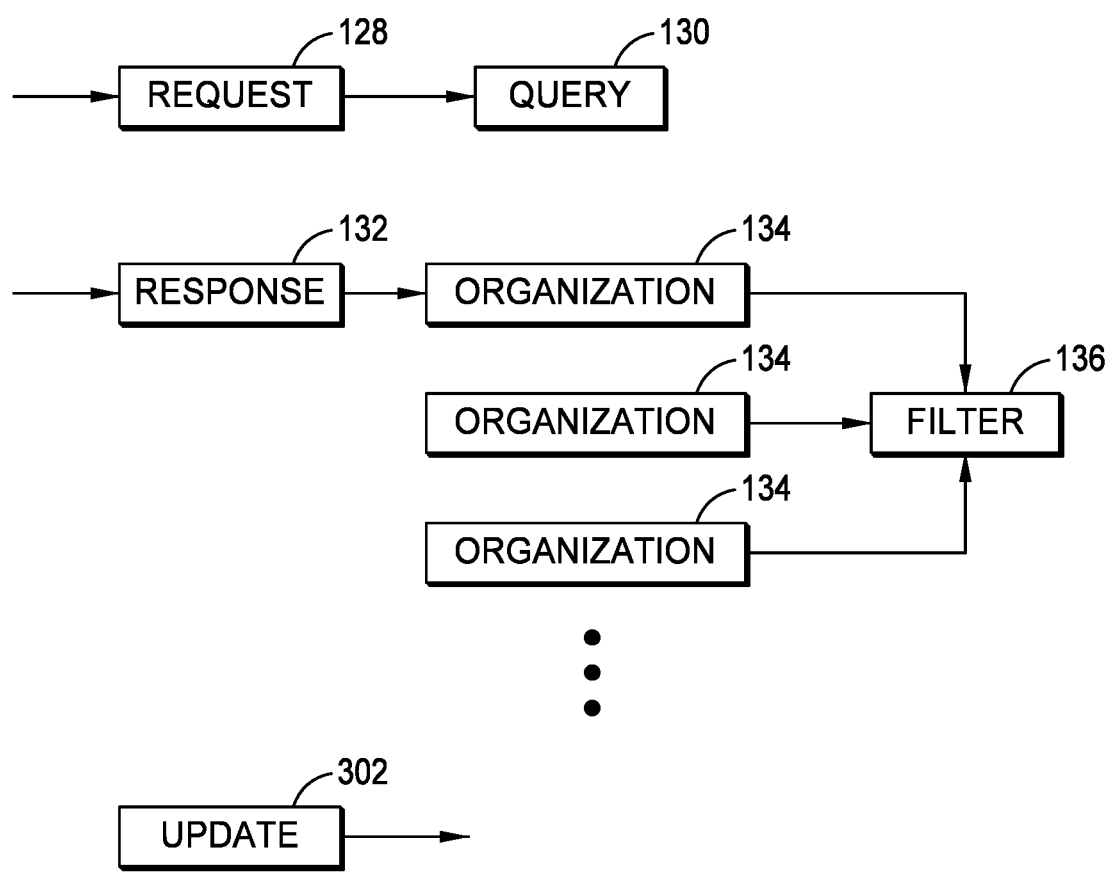
FIG. 3 illustrates an example message server of the system of FIG. 1.

FIG. 3 illustrates an example message server 110 of the system 100 of FIG. 1. Generally, FIG. 3 shows the message server 110 generating a filter 136 that filters future messages from particular organizations 134. By applying the filter 136, the message server 110 may prevent future messages from the organizations 134 from being unintentionally sent to an incorrect user 102, who has been reassigned a deactivated telephone number.

The message server 110 receives a request 128 to deactivate a telephone number when a user 102 wishes to deactivate the telephone number. The user 102 may inform a telecommunications carrier or the message server 110 of the user's 102 desire to deactivate the telephone number. As a result, the message server 110 receives the request 128 that may identify the telephone number to be deactivated. During the deactivation process, the message server 110 generates a query 130 using the telephone number. The message server 110 communicates the query 130 to the blockchain system to query a blockchain for the telephone number.

The message server 110 receives a response 132 from the blockchain system. The response 132 may be generated by querying the blockchain for the telephone number. The response 132 may identify the organizations 134 that have previously sent messages to the telephone number. The message server 110 analyzes the response 132 and uses the organizations 134 included in the response 132 to generate the filter 136. The filter 136 may include information that identifies the organizations 134. Additionally, the filter 136 may identify the purposes 122 or the types 124 of messages that were previously sent by the organizations 134.

The message server 110 may generate an update 302 during the deactivation process. The update 302 may indicate the telephone number that is being deactivated. The message server 110 may communicate the update 302 to one or more of the organizations 134 identified in the response 132. When the organizations 134 receive the update 302, the organizations 134 may be informed that the telephone number is being deactivated. In response, the organizations 134 may update internal systems so that the organizations 134 do not send future messages to the telephone number that is being deactivated.

In certain embodiments, the message server 110 sorts the organizations 134 indicated in the response. For example, the message server 110 may sort the organizations 134 based on how many messages 118 that the organizations 134 previously sent to the telephone number, which may be indicated by the number of times the organizations appear in the blockchain or the response 132. As another example, the message server 110 may sort the organizations 134 alphabetically or by recency (e.g., the organization 134 that sent a message 118 most recently is first or last in the sorting). By sorting the organizations 134, the message server 110 may generate the filter 136 to analyze future messages according to a certain ordering of the organizations 134, which may improve the speed of the filter 136.

Figure 4:
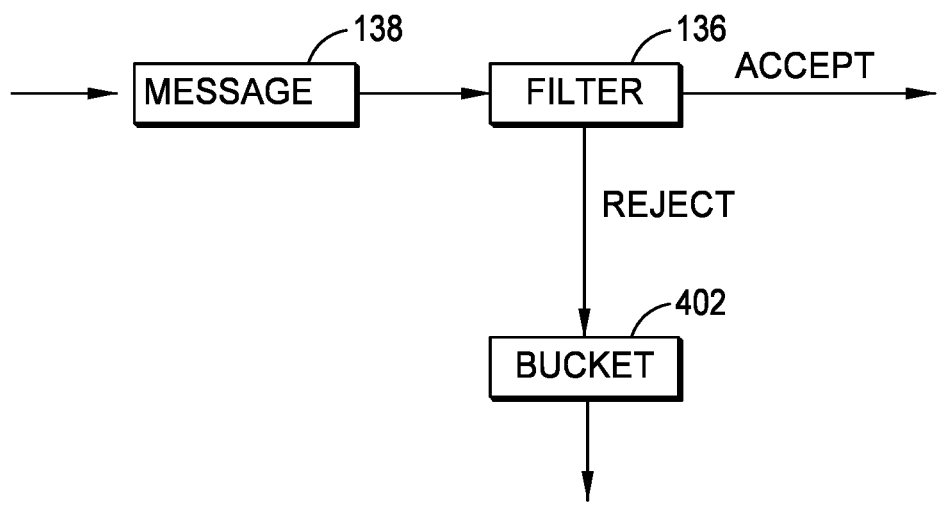
FIG. 4 illustrates an example message server of the system of FIG. 1.

FIG. 4 illustrates an example message server 110 of the system 100 of FIG. 1. Generally, FIG. 4 shows the message server 110 applying the filter 136. In particular embodiments, by applying the filter 136, the message server 110 prevents certain messages 138 from being unintentionally sent to an incorrect user 102. As a result, the privacy and security of another user 102 is improved.

The message server 110 receives a subsequent message 138. The message 138 may include information that identifies the sender of the message 138, the telephone number 125 for the recipient, as well as a purpose or type of the message 138. The message server 110 locates the filter 136 for the telephone number 125. The message server 110 then runs the message 138 through the filter 136 to see if the filter 136 catches or filters the message 138. The filter 136 may catch the message 138 if the message 138 is sent by an organization 134 that is identified by the filter 136. Additionally, the message 138 may be caught by the filter 136, if the message 138 has a purpose or a type that is identified for the organization 134.

If the message 138 is not filtered or caught by the filter 136, the message 138 may be accepted. In response, the message server 110 may communicate or transmit the message 138 onto its intended destination. If the filter 136 catches or filters the message 138, then the message 138 is rejected. In response, the message server 110 may not transmit or communicate the message 138 to its intended destination. In some embodiments, the message server 110 adds the rejected message 138 to a bucket 402. The bucket 402 may hold rejected messages for the organization that sent the message 138. The message server 110 may communicate the bucket 402 of rejected messages 138 to the organization 134 to alert the organization 134 of the messages 138 that were not communicated to their intended recipients. In response, the organizations 134 may update internal systems so that the organizations 134 do not send subsequent messages 138 intended for those recipients.

Figure 5:
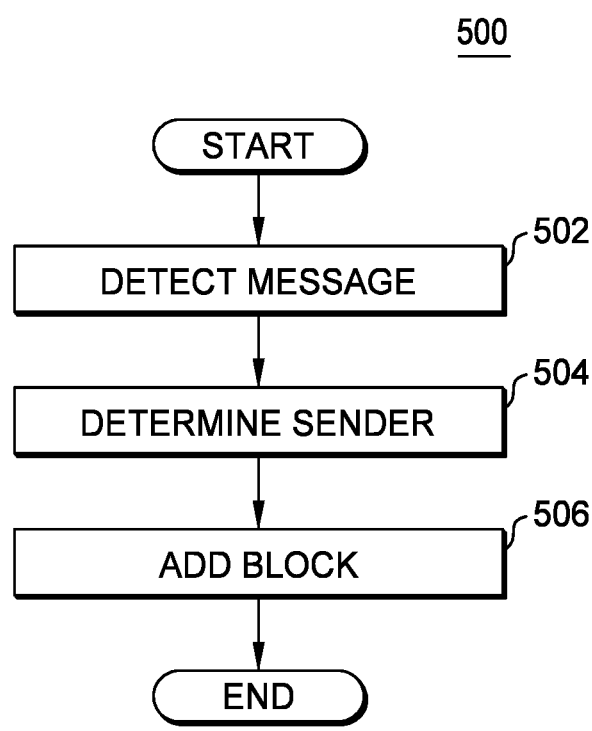
FIG. 5 is a flowchart of an example method performed in the system of FIG. 1.

FIG. 5 is a flowchart of an example method 500 performed in the system 100 of FIG. 1. In particular embodiments, the message server 110 performs the method 500. By performing the method 500, the message server 110 generates or updates a blockchain used to track the organizations that have sent messages 118 to a telephone number.

In block 502, the message server 110 detects a message 118. The message 118 may have been sent by an organization 134 to a telephone number 125. The message server 110 may receive or intercept the message 118 before the message 118 reaches the intended recipient. In certain embodiments, the message 118 may identify the sender 120 of the message 118 along with a purpose 122, or a type 124 of the message 118.

In block 504, the message server 110 determines the sender 120 of the message 118. For example, the message server 110 may parse or read a header of the message 118 to determine the sender 120 of the message 118. The header may include an identifier or a telephone number for the sender 120 of the message 118. The message server 110 may determine the sender 120 using the information in the header.

In block 506, the message server 110 adds a block 126 to the blockchain 112 for the telephone number 125 of the intended recipient of the message 118. The message server 110 may generate the block 126 or generate an instruction that is communicated to the blockchain system. In response, the blockchain system may add the block 126 to the blockchain 112 for the telephone number 125 of the intended recipient of the message 118. The block 126 may include or encapsulate information about the sender 120 of the message 118. Additionally, the block 126 may include or encapsulate information about the purpose 122 or the type 124 of the message 118. By adding the block 126 to the blockchain 112 for the telephone number 125, the blockchain 112 may be updated to identify the sender 120 as an organization 134 that has sent a message 118 to the telephone number 125.

Figure 6:
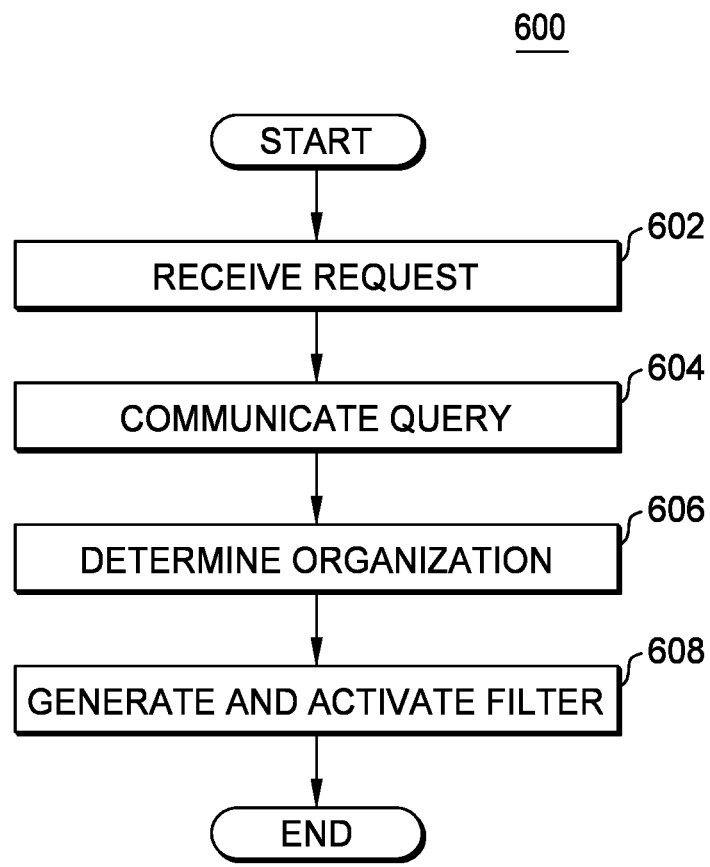
FIG. 6 is a flowchart of an example method performed in the system of FIG. 1.

FIG. 6 is a flowchart of an example method 600 performed in the system 100 of FIG. 1. In particular embodiments, the message server 110 performs the method 600. By performing the method 600, the message server 110 generates a filter 136 that may be used to filter messages intended for deactivated telephone numbers.

In block 602, the message server 110 receives a request 128. The request 128 may be a request to deactivate a telephone number 125. A user 102 wishing to deactivate the telephone number 125 may have communicated the request 128 to the message server 110. In block 604 the message server 110 communicates a query 130 in response to the request 128. The query 130 may indicate the telephone number 125 that is to be deactivated. The message server 110 may communicate the query 130 to a blockchain system or to a database 108 of the blockchain system. The blockchain system or the database 108 may query a blockchain 112 for the telephone number 125 and retrieve the information in the blocks 126 of the blockchain 112. The blockchain system or the database 108 may then communicate this information back to the message server 110.

In block 606, the message server 110 determines an organization 134 that had previously sent a message 118 to the telephone number 125. The message server 110 may receive a response 132 from the blockchain system with the database 108 that identifies the organization 134. The response 132 may include information resulting from querying the blockchain 112 for the telephone number 125. The response 132 may identify the organizations 134 that have previously sent messages 118 to the telephone number 125. The message server 110 may review or analyze the response 132 to determine the organization 134. In some embodiments, the message server 110 may also determine purposes 122 or types 124 of the messages 118 sent by the organizations 134 by reviewing the response 132.

In block 608, the message server 110 generates and activates a filter 136 using the information in the response 132. For example, the filter 136 may identify the organization 134 determined in block 606. As a result, the filter 136 may filter or catch subsequent messages sent by the organization 134.

Figure 7:
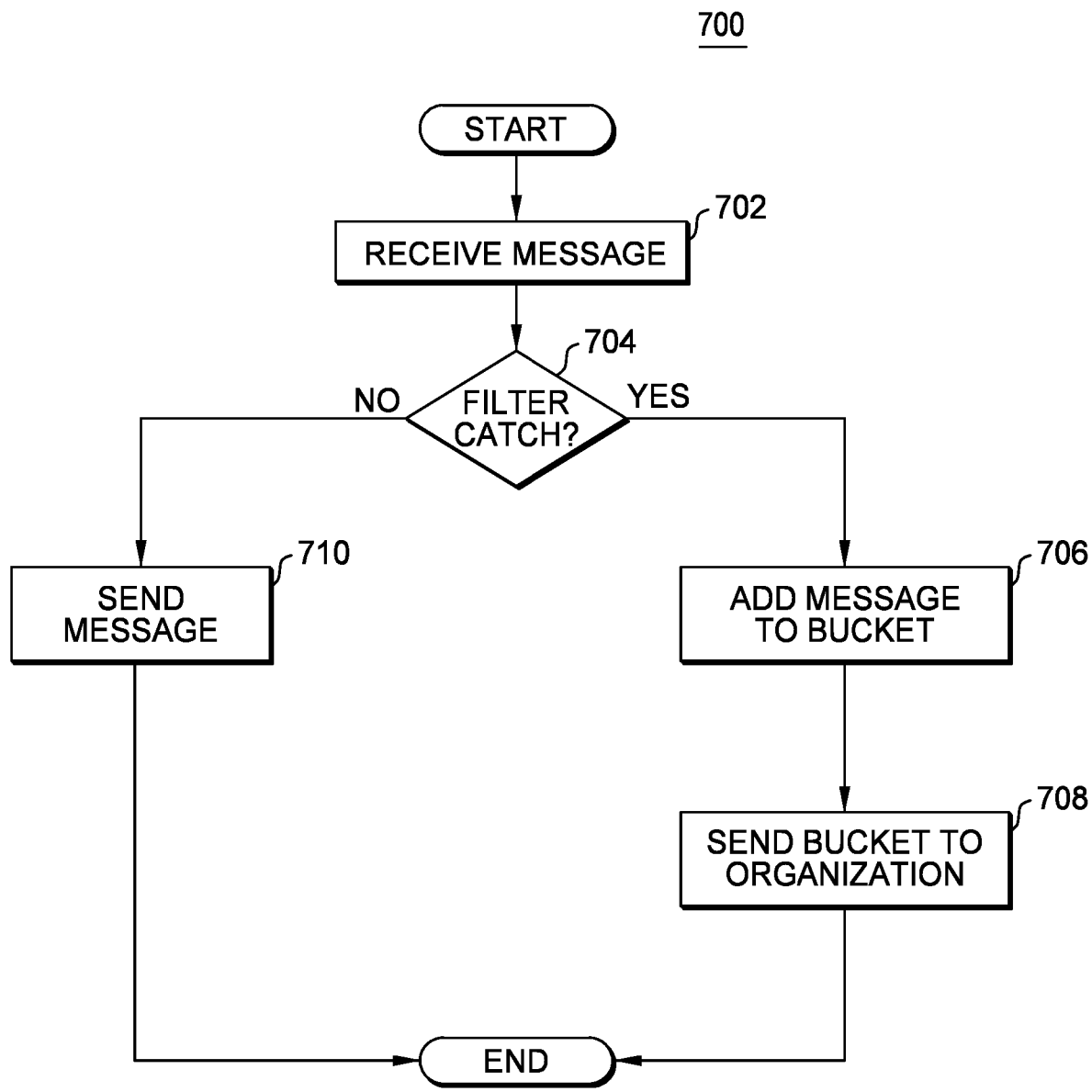
FIG. 7 is a flowchart of an example method performed in the system of FIG. 1.

FIG. 7 is a flowchart of an example method 700 performed in the system 100 of FIG. 1. In particular embodiments, the message server 110 performs the method 700. By performing the method 700, the message server 110 filters subsequent messages 138 sent by an organization 134 to a deactivated telephone number 125.

In block 702, the message server 110 receives a message 138. The message 138 may have been sent by an organization 134 and may be intended for a deactivated telephone number 125. The message server 110 runs the message 138 through the filter 136 and determines whether the filter 136 catches the message 138 in block 704. The message server 110 may identify the filter 136 to use based on the intended recipient identified in the message 138. For example, the message server 110 may use the filter 136 for the telephone number 125 identified in the message 138. The filter 136 may catch or filter the message 138, if the organization 134 that sent the message 138 matches an organization 134 identified in the filter 136.

If the filter 136 catches the message 138, then the message server 110 adds the message 138 to a bucket 402 in block 706. The bucket 402 may be for the organization 134 that sent the message 138. The bucket 402 may hold messages 138 sent by the organization 134 that were also caught by filters 136. In block 708, the message server 110 sends the bucket 402 to the organization 134 to indicate to the organization 134 that the messages 138 in the bucket 402 were not communicated to their intended recipients, because the telephone numbers 125 of these intended recipients had been deactivated. The organization 134 may then update internal systems so that the organization 134 does not send additional messages 138 to these deactivated telephone numbers 125. Additionally, the message server 110 may not communicate or transmit the message 138 to its intended destination.

If the filter 136 does not catch the message 138, then the message server 110 sends the message 138 to its intended destination in block 710. For example, the message server 110 may communicate the message 138 to the telephone number 125 identified in the message 138. In this manner, the intended recipient receives the message 138. In this manner, the message server 110 protects the privacy and security of a previous user of the deactivated telephone number 125.

In summary, a system 100 may prevent messages intended for a previous user from being sent to a new user when a telephone number is reassigned. Generally, the system 100 uses a blockchain 112 to store and track the various organizations 134 that identify a user 102 using a telephone number 125. When the user 102 receives a message 118 from an organization 134, a block 126 identifying or linked to that organization 134 may be added to the blockchain 112. When the user 102 requests deactivation of the telephone number 125, the system 100 may query the blockchain 112 to determine the organizations 134 that sent messages 118 to the user 102 through the telephone number 125. The system 100 may then generate a filter 136 for the telephone number 125 that will catch messages 138 that those organizations 134 may mistakenly send to the user 102 through the deactivated telephone number 125, which may prevent those messages 138 from unintentionally being sent to another user. In some instances, the system 100 may even alert the organizations 134 when the telephone number 125 is being deactivated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 8 illustrates an example computing environment 800. The computing environment 800 contains an example of an environment for the execution of at least some of the computer code involved in performing the inventive methods, such as messaging code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

While the foregoing is directed to embodiments of the present invention, other and further embodiments of the invention may be devised without departing from the basic scope thereof, and the scope thereof is determined by the claims that follow.

What is claimed is:

1. A method comprising:
   in response to a request to deactivate a telephone number, communicating a query to a blockchain for the telephone number, wherein a block on the blockchain was added to the blockchain in response to an organization sending a first message to the telephone number, and wherein the block identifies the organization;
   identifying, based on a response to the query, the organization; and
   generating and activating, based on the block on the blockchain, a filter configured to stop a second message sent by the organization to the telephone number.

2. The method of claim 1 further comprising:
   prior to the request to deactivate the telephone number, detecting a first message intended to be sent to the telephone number;
   determining a sender of the first message; and
   adding a block to the blockchain that identifies the sender.

3. The method of claim 1, further comprising determining at least a purpose or a type of the first message, wherein the second message is of at least the purpose or the type.

4. The method of claim 1, further comprising communicating an update to the organization that the telephone number is deactivated.

5. The method of claim 1, further comprising:
   sending a first message intended for the telephone number through the filter; and
   preventing the first message from being sent to the telephone number if the filter catches the first message.

6. The method of claim 5, further comprising sending the first message to the organization in response to determining that the organization sent the first message.

7. The method of claim 1, further comprising porting the blockchain in response to a request to port the telephone number.

8. A system comprising:
   a memory; and
   a processor communicatively coupled to the memory, the processor configured to:
      in response to a request to deactivate a telephone number, communicate a query to a blockchain for the telephone number, wherein a block on the blockchain was added to the blockchain in response to an organization sending a first message to the telephone number, and wherein the block identifies the organization;
      identify, based on a response to the query, the organization; and
      generate and activate, based on the block on the blockchain, a filter configured to stop a second message sent by the organization to the telephone number.

9. The system of claim 8, wherein the processor is further configured to:
   prior to the request to deactivate the telephone number, detect a first message intended to be sent to the telephone number;
   determine a sender of the first message; and
   add a block to the blockchain that identifies the sender.

10. The system of claim 8, wherein the processor is further configured to determine at least a purpose or a type of the first message, wherein the second message is of at least the purpose or the type.

11. The system of claim 8, wherein the processor is further configured to communicate an update to the organization that the telephone number is deactivated.

12. The system of claim 8, wherein the processor is further configured to:
send a first message intended for the telephone number through the filter; and
prevent the first message from being sent to the telephone number if the filter catches the first message.

13. The system of claim 12, wherein the processor is further configured to send the first message to the organization in response to determining that the organization sent the first message.

14. The system of claim 8, wherein the processor is further configured to port the blockchain in response to a request to port the telephone number.

15. A non-transitory computer readable medium storing instructions that, when executed by a processor, cause the processor to:
in response to a request to deactivate a telephone number, communicate a query to a blockchain for the telephone number, wherein a block on the blockchain was added to the blockchain in response to an organization sending a first message to the telephone number, and wherein the block identifies the organization;
generate, based on the block on the blockchain, a filter configured to stop a message sent by the organization to the telephone number;
sending a second message intended for the telephone number through the filter; and
prevent the second message from being sent to the telephone number in response to determining that the filter caught the second message.

16. The medium of claim 15, wherein the instructions further cause the processor to:
prior to the request to deactivate the telephone number, detect a third message intended to be sent to the telephone number;
determine a sender of the third message; and
add a block to the blockchain that identifies the sender.

17. The medium of claim 15, wherein the instructions further cause the processor to determine at least a purpose or a type of the first message, wherein the second message is of at least the purpose or the type.

18. The medium of claim 15, wherein the instructions further cause the processor to communicate an update to the organization that the telephone number is deactivated.

19. The medium of claim 15, wherein the instructions further cause the processor to send the second message to the organization in response to determining that the organization sent the second message.

20. The medium of claim 15, wherein the instructions further cause the processor to port the blockchain in response to a request to port the telephone number.

\* \* \* \* \*